United States Patent
Tseng et al.

(10) Patent No.: US 7,894,665 B2
(45) Date of Patent: Feb. 22, 2011

(54) VIDEO ANNOTATION METHOD BY INTEGRATING VISUAL FEATURES AND FREQUENT PATTERNS

(75) Inventors: Shin-Mu Tseng, Tainan (TW); Jhih-Hong Huang, Liuying Shiang (TW); Ja-Hwung Su, Qiaotou Shiang (TW)

(73) Assignee: National Cheng Kung University, Tainan (TW)

(*) Notice: Subject to any disclaimer, the term of this patent is extended or adjusted under 35 U.S.C. 154(b) by 1014 days.

(21) Appl. No.: 11/713,734

(22) Filed: Mar. 5, 2007

(65) Prior Publication Data

US 2008/0059872 A1    Mar. 6, 2008

(30) Foreign Application Priority Data

Sep. 5, 2006    (TW) ............... 95132741 A

(51) Int. Cl.
*G06K 9/62* (2006.01)
(52) U.S. Cl. .................. 382/159; 382/226; 715/231
(58) Field of Classification Search ............... None
See application file for complete search history.

(56) References Cited

U.S. PATENT DOCUMENTS

| | | | |
|---|---|---|---|
| 7,382,933 B2* | 6/2008 | Dorai et al. | 382/276 |
| 2002/0018594 A1* | 2/2002 | Xu et al. | 382/190 |
| 2006/0107216 A1* | 5/2006 | Cooper et al. | 715/724 |
| 2007/0041667 A1* | 2/2007 | Cox | 382/305 |
| 2007/0297683 A1* | 12/2007 | Luo et al. | 382/224 |
| 2008/0059872 A1* | 3/2008 | Tseng et al. | 715/231 |
| 2008/0193016 A1* | 8/2008 | Lim et al. | 382/190 |

FOREIGN PATENT DOCUMENTS

WO    WO 2005/076594    *    8/2005

OTHER PUBLICATIONS

Singhal, A.; Jiebo Luo; Weiyu Zhu;, Probabilistic spatial context models for scene content understanding, Computer Vision and Pattern Recognition, 2003. Proceedings. 2003 IEEE Computer Society Conference on, vol. 1, Jun. 18-20, 2003 pp. I-235-I-241 vol. 1.*
Tseng et al., "A Novel Video Annotation Method by Integrating Visual Features and Frequent Patterns", in proceedings of the sixth international workshop on Multimedia Data Mining, Philadelphia, PA, USA, Aug. 20-23, 2006.

* cited by examiner

*Primary Examiner*—Bhavesh M Mehta
*Assistant Examiner*—Tahmina Ansari
(74) *Attorney, Agent, or Firm*—Rabin & Berdo, P.C.

(57) ABSTRACT

A video annotation method by integrating visual features and frequent patterns is disclosed. This method is featured in integrating a statistical model based on visual features with a sequential model and an association model constructed by data mining skills for automatically annotating unknown videos. This method takes both of visual features and semantic patterns into consideration simultaneously through the combination of three different models so as to enhance the accuracy of annotation.

17 Claims, 5 Drawing Sheets

VIDEO ANNOTATION METHOD BY INTEGRATING VISUAL FEATURES AND FREQUENT PATTERNS

RELATED APPLICATIONS

The present application is based on, and claims priority from, Taiwan Application Serial Number 95132741, filed Sep. 5, 2006, the disclosure of which is hereby incorporated by reference herein in its entirety.

FIELD OF THE INVENTION

The present invention relates to a video annotation method, and more particularly, to the video annotation method by integrating visual features and frequent patterns.

BACKGROUND OF THE INVENTION

With the advance of the information technology in addition to the strong development of storage devices and the technologies of network transmission and data compression, the usage of multimedia data has been rapidly increased, such as photos, video clips, music, etc. For processing the daily increased multimedia data and the diversities thereof, the technique for searching the contents of the multimedia data is always quite an important topic, wherein the searching technique with respect to the video chips is quite important thereto.

One of the most important factors in the searching technique for video chips is related to how to generate searching indexes (annotations) and use the annotations of the video chips to enhance the searching efficacy and efficiency. The video annotation method is roughly divided into two categories: one is to perform annotation on video data by using low-level features of the video chip itself; and the other is to perform annotation on video data from the human viewpoint. Although performing annotation on a video clip via the human viewpoint can humanize the searching technique, yet it takes a large amount of manpower and time due to immense video data, so that there is a need to develop a technique for automatically performing annotation on multimedia data.

A conventional skill uses the relationships between low-level features of an image and high-level semantic concepts to perform annotation on the image. However, the contents of a video clip are too complex, thus resulting in large gaps and misinterpretation between low-level features of an image and high-level semantic concepts. Another conventional skill uses association rules combined with a fuzzy theory to perform annotation on a video clip, thereby distinguish if the video clip is a report from an anchorperson or that from an outdoor scene; or finds the special events and frequently occurring patterns via the continuous relevance among video clips. These conventional skills are used to extract an abstract of a video clip, or to perform annotation on the special events of some video clips, but all have to adopt knowledge of experts or professional fields, and can only be applied to the video clips of a specific type, thus lacking generic applicability.

SUMMARY OF THE INVENTION

Hence, there is a need to develop a video annotation method by integrating visual features and frequent patterns for taking into account the contents of a video clip itself, associative rules and sequential association among the frames composing the video clip; and using the features of related algorithms, so as to overcome the shortcomings of the conventional skills and increase predicting accuracy.

One aspect of the present invention is to provide a video annotation method by integrating visual features and frequent patterns for combining the rules found from the visual features and the data-mining technologies, thereby promoting the predicting accuracy in an automatic annotation process.

Another aspect of the present invention is to provide a video annotation method by integrating visual features and frequent patterns for use in various video clips without the assistance from experts.

According to an embodiment of the present invention, a video annotation method by integrating visual features and frequent patterns is provided. The video annotation method is divided into a training stage and a predicting stage, wherein the training stage is used for building a statistical model, a sequential model and an association model.

In the training stage, at first, a plurality of fundamental words (for example, the standard category tree provided by NIST (National Institute of Standards and Technology)) are provided. Then, an annotated video clip is provided, wherein the annotated video clip is composed of a plurality of first shots, and each of the first shots is composed of a plurality of first frames, and each of the first shots is corresponding to at least one first annotation word of the fundamental words. Thereafter, a data-preprocessing step is performed. In the data preprocessing step, at first, a plurality of first critical frames respectively with respect to the first shots are selected from the first frames of each of the first shots. Then, each of the first critical frames is divided into a plurality of first image blocks, such as N×M units of image blocks, wherein N and M are the integers greater than 0. Thereafter, low-level features of the first image blocks of each of the first sots are respectively extracted, so as to obtain a plurality of first block feature vectors of each of the first critical frames. Meanwhile, low-level features of each of the first critical frames are respectively extracted, so as to obtain a plurality of first feature vectors of the first shots. Then, a grouping step is performed for dividing the first feature vectors into a plurality of shot groups, wherein the shot groups have a plurality of identification codes respectively. Thereafter, the first feature vectors are corresponded to the identification codes respectively, and the identification codes of the shot groups are combined as at least one first scene.

Thereafter, in the training stage, a statistical model is built by using the first block feature vectors and the at least one first annotation word with respect to each of the first shots in accordance with a Gaussian Mixtures Model and conditional probabilities, wherein the statistical model has a statistical probability list used for indicating the respective appearing probabilities of the fundamental words corresponding to the first block feature vectors of each of the first shots.

Further, in the training stage, a sequential model is built. At first, a step is performed for finding frequent patterns of the shot groups in the first scene in accordance with a continuous relevance algorithm, thereby obtaining a plurality of first sequential rules, wherein the first sequential rules are the sequential transaction combinations of any two identification codes arbitrarily selected in each of the at least one first scene. Then, the sequential model is built in accordance with each of the first sequential rules and the at least one first annotation word corresponding thereto, wherein the sequential model has a sequential probability list used for indicating the respective appearing probabilities of the fundamental words corresponding to each of the first sequential rules.

Further, in the training stage, an association model is built. At first, the identification codes repeated in each of the at least one first scene are removed. Thereafter, a step is performed for sorting the identification codes in each of the at least one first scene. Then, a step is performed for finding the entire frequent patterns of the shot groups in the at least one first scene in accordance with an association rules algorithm, thereby obtaining a plurality of first association rules, wherein the final item in each of the first association rules only has one single identification code. Thereafter, the association model is built in accordance with each of the first association rules and said at least one first annotation word corresponding thereto, wherein the association model has an associative probability list used for indicating the respective appearing probabilities of the fundamental words corresponding to each of the first associative rules.

After the statistical model, the sequential model and the association model are built, a predicting stage is entered for inputting a second shot desired to be annotated into the statistical model, said sequential model, thereby obtaining a keyword statistical probability list, a keyword sequential probability list and a keyword associative probability list, wherein the keyword statistical probability list is used for indicating the respective appearing probabilities of the fundamental words corresponding to a plurality of second block feature vectors of the second shot; the keyword sequential probability list is used for indicating the respective appearing probabilities of the fundamental words corresponding to a plurality of second sequential rules of the second shot; and the keyword associative probability list used for indicating the respective appearing probabilities of the fundamental words corresponding to associative rules of the second shot.

In the predicting stage, at first, the second shot is provided, wherein the second shot belongs to a second scene and is composed of a plurality of second frames. Then, a second critical frame is selected from the second frames of the second shot. Thereafter, the second critical frame is divided into a plurality of second image blocks, such as N×M units of image blocks, wherein N and M are the integers greater than 0. Then, low-level features of the second image blocks are respectively extracted, so as to obtain the second block feature vectors of the second critical frame of the second shot Thereafter, the second block feature vectors are inputted into the statistical model, so as to obtain the keyword statistical probability list used for indicating the respective appearing probabilities of the fundamental words corresponding to the second block feature vectors.

Further, in the predicting stage, at least one third shot antecedent to the second shot in the second scene is inputted, and at least one third critical frame of the third shot is respectively selected. Then, low-level features of the second critical frame and low-level features of the third critical frame are respectively extracted, so as to obtain a plurality of second feature vectors. Thereafter, the grouping step is performed on the second feature vectors in accordance with a statistic distance algorithm (such as an Euclidean Distance method), and the second feature vectors are corresponded to the identification codes respectively. Then, a step is performed for finding frequent patterns of the shot groups in the second scene in accordance with the aforementioned continuous relevance algorithm, so as to obtain a plurality of second sequential rules, wherein the second sequential rules are the sequential transaction combinations of any two identification codes arbitrarily selected in the second scene. Thereafter, the second sequential rules are inputted into the sequential model, so as to obtain the keyword sequential probability list used for indicating the respective appearing probabilities of the fundamental words corresponding to the second sequential rules with respect to the second feature vectors.

Further, in the predicting stage, at first, the identification codes repeated in the second scene are removed. Then, a step is performed for sorting the identification codes in the second scene. Thereafter, a step is performed for finding the entire frequent patterns of shot groups in the second scene in accordance with the association rules algorithm, thereby obtaining a plurality of second association rules, wherein the final item in each of the second association rules only has one single identification cod. Then, the second association rules are inputted into the association model, so as to obtain the keyword associative probability list used for indicating the respective appearing probabilities of the fundamental words corresponding to the second associative rules regarding the second shot.

Further, in the predicting stage, the respective appearing probabilities of the fundamental words in the keyword statistical probability list and the keyword sequential probability list and/or the keyword associative probability list are added up, so as to obtain a keyword appearing probability list. Then, at least one second annotation word is selected from the keyword appearing probability list in accordance with a predetermined lower limit, wherein the second annotation word is used as an annotation to the second shot.

Hence, the application of the present invention can combine the rules found from the visual features and the data-mining technologies to promote the predicting accuracy in an automatic annotation process without the assistance from experts; and is suitable for use in various video clips.

BRIEF DESCRIPTION OF THE DRAWINGS

The foregoing aspects and many of the attendant advantages of this invention are more readily appreciated as the same become better understood by reference to the following detailed description, when taken in conjunction with the accompanying drawings, wherein.

DETAILED DESCRIPTION OF THE PREFERRED EMBODIMENT

In general, a video clip can be divided into frames, shots or scenes, wherein a frame is the smallest unit, which is equivalent to a photograph; a shot is composed of a series of continuous frames, which is defined by activating and shutting down a camera lens in filming, or by the times points defined in editing; and a scene is composed of a series of continuous shots for dividing the entire video clip into short stories or paragraphs. The video clip is composed of a series of continuous scenes, and critical frames are selected for representing respective shots.

The present invention is to provide annotation to a video clip (shot) desired to be annotated by extracting low-level features from the critical frames respectively; combining the data-mining technologies and statistical methods; and recording the patterns of associative rules and sequential rules.

Figure 1:
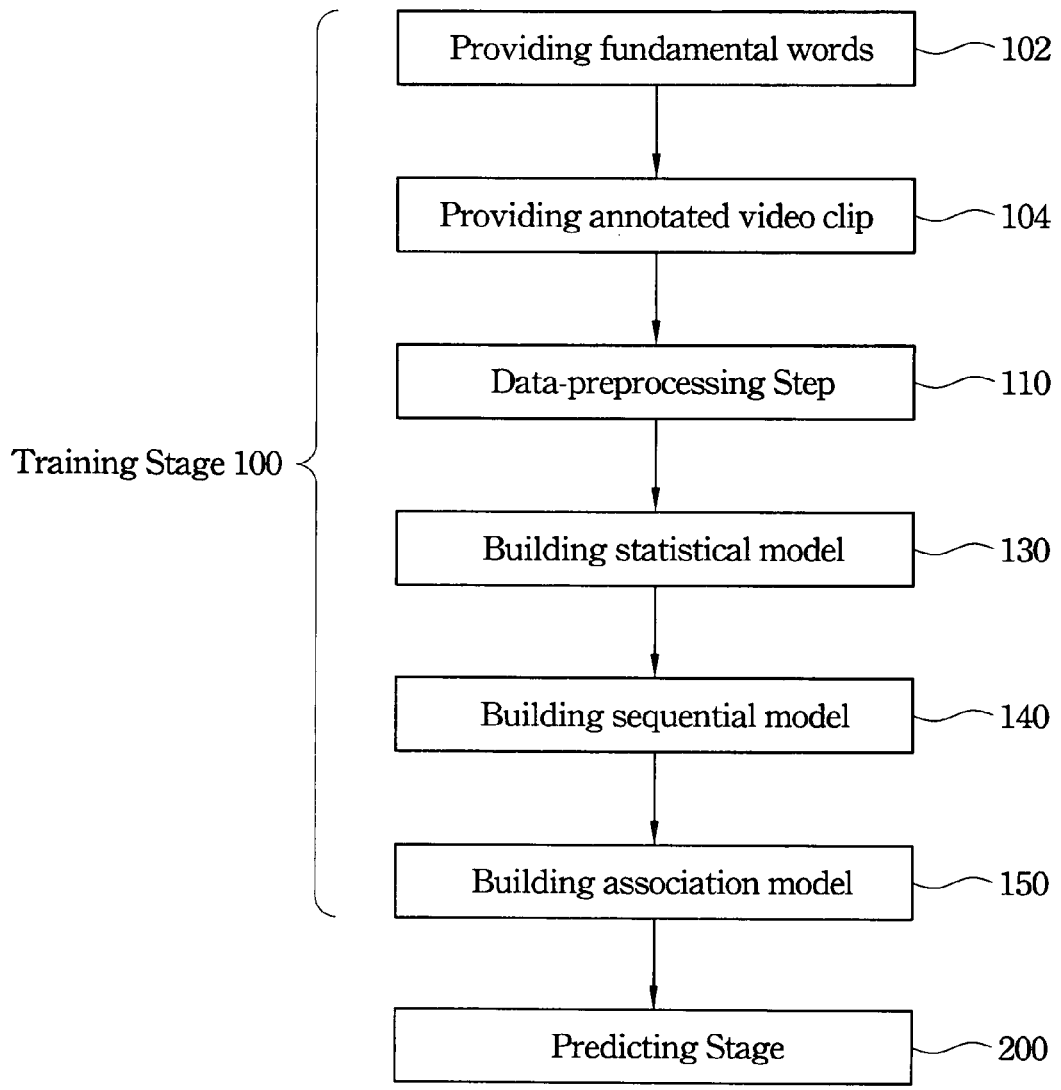
FIG. 1 is a schematic diagram showing the steps of a video annotation method by integrating visual features and frequent patterns according to an embodiment of the present invention.

Referring to FIG. 1, FIG. 1 is a schematic diagram showing the steps of a video annotation method by integrating visual features and frequent patterns according to an embodiment of the present invention. The video annotation method of the present embodiment can be divided into a training stage 100 and a predicting stage 200.

Training Stage 100

At first, a plurality of fundamental words are provided for annotation to a video clip (step 102), i.e. the annotation words used for annotation to the video clip are all selected from those fundamental words, wherein those fundamental words can be, for example, the standard category tree provided by NIST (National Institute of Standards and Technology), such as 133 words shown in Table 1. For the convenience of explanation, assume that the fundamental words are {k1, k2, k3, k4, k5, k6}, wherein k1, k2, k3, k4, k5, k6 are "car", "road", "sky", "person", "building", "outdoors" respectively.

Thereafter, an annotated video clip is provided (step 104). Just as described above, the annotated video clip is composed of a plurality of shots, and each of the shots is composed of a plurality of frames, and each of the shots is corresponding to an annotation word set of the fundamental words {k1, k2, k3, k4, k5, k6}, and the annotation word set includes at least one annotation word such as {k1, k3, k4}. Meanwhile, an annotation word list is generated by determining if the fundamental words have ever been used as the annotation words. For example, the fundamental words (the words have appeared) are {k1, k2, k3, k4, k5, k6}, and the annotation words are {k1, k3, k4} in this example, so that the annotation word list corresponding to the annotation words is {1, 0, 1, 1, 0, 0}, wherein "1" stands for the word that has been used for annotation; and "0" stands for the word that has not been used for annotation yet.

Figure 2:
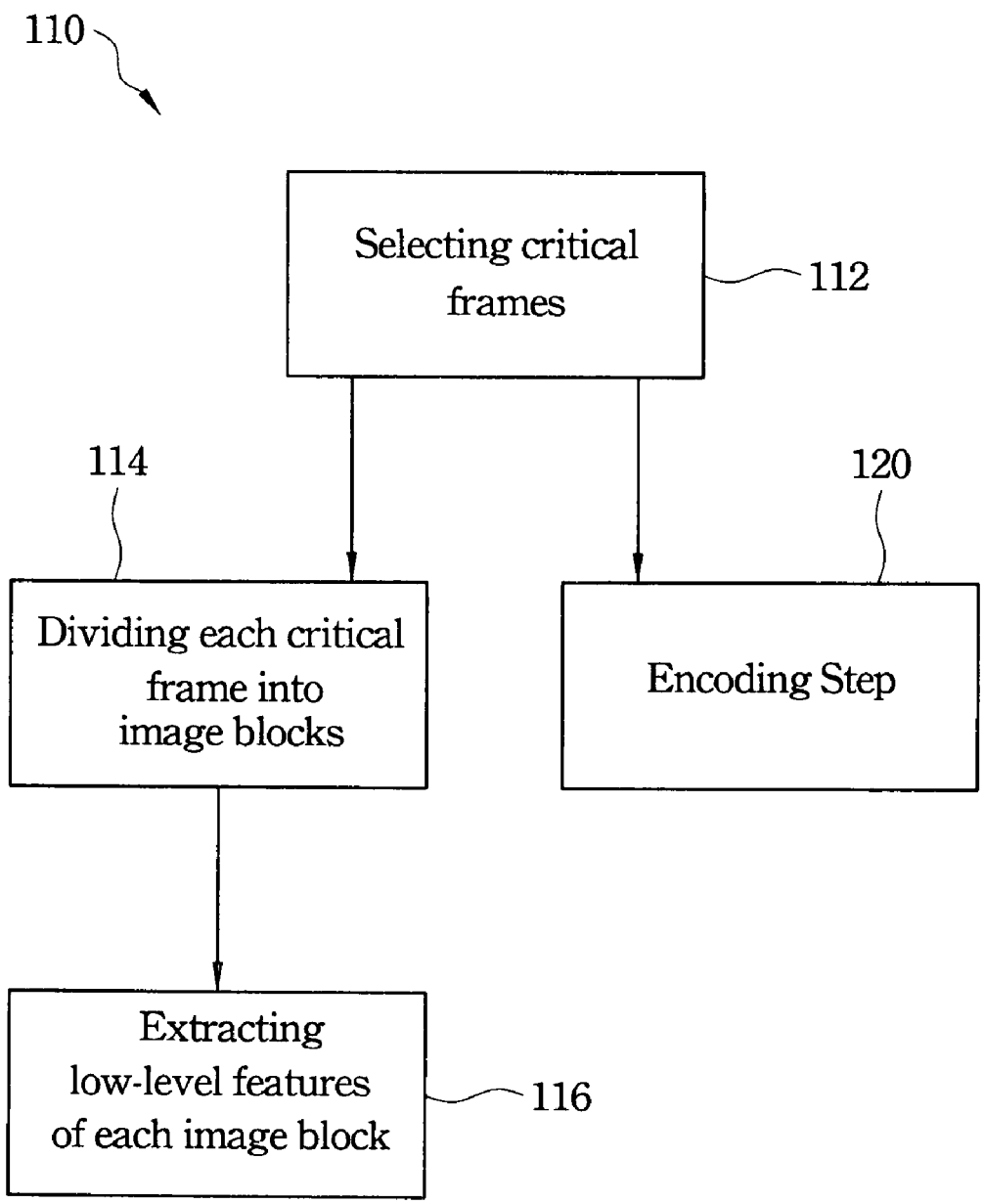
FIG. 2 is a schematic flow diagram showing the process of a data-preprocessing step according to the embodiment of the present invention.

Referring to FIG. 1 and FIG. 2, FIG. 2 is a schematic flow diagram showing the process of a data-preprocessing step according to the embodiment of the present invention. After

TABLE 1

NIST Standard Category Tree

| Event: | Scene: | Object: |
|---|---|---|
| person_action | indoors | animal |
|    monologue |    studio_setting |    chicken |
|       news_subject_monologue |    non_studio_setting |    cow |
|    sitting |       house_setting | audio |
|    standing |       classroom_setting |    male_speech |
|    walking |       factory_setting |    female_speech |
|    running |       laboratory_setting | human |
|    addressing |       meeting_room_setting |    face |
| people_event |       briefing_room_setting |       male_face |
|    parade |       office_setting |          bill_clinton |
|    picnic |       store_setting |          newt_gingrich |
|    meeting |       transportation_setting |          male_news_person |
| sport_event | outdoors |          male_news_subject |
|    baseball |    nature_vegetation |       female_face |
|    basketball |       flower |          madeleine_albright |
|    hockey |       tree |          female_news_person |
|    ice_skating |       forest |          female_news_subject |
|    swimming |       greenery |    person |
|    tennis |    nature_non_vegetation |    people |
|    football |       sky |    crowd |
|    soccer |       cloud | man_made_object |
| transportation_event |       water_body |    clock |
|    car_crash |       snow |    chair |
|    road_traffic |       beach |    desk |
|    airplane_takeoff |       desert |    telephone |
|    space_vehicle_launch |       land |    flag |
|    missle_launch |       mountain |    newspaper |
| catoon |       rock |    blackboard |
| weather_news |       waterfall |    monitor |
| physical_violence |       fire |    whiteboard |
|    explosion |       smoke |    microphone |
|    riot |    man_made_scene |    podium |
|    fight |       bridge | food |
|    gun_shot |       building | transportation |
| |       cityscape |    airplane |
| |       road |    bicycle |
| |       statue |    boat |
| |    outer_space |    car |
| |    sound |    tractor |
| |       music |    train |
| |       animal_noise |    truck |
| |       vehicle_noise |    bus |
| |       cheering | graphics_and_text |
| |       clapping |    text_overlay |
| |       laughter |    scene_text |
| |       singing |    graphics |
| | |    painting |
| | |    photographs | step 104, a data-preprocessing step 110 is performed. In the data-preprocessing step 110, at first, a plurality of critical frames representing the respective shots are selected from the frames of each shot (step 112), wherein each critical frame is corresponding to an annotation word set such as {k1, k3, k4}. Then, each frame is divided into a plurality of image blocks, such as 3×2 units of image blocks (step 114). Thereafter, low-level features of the image blocks are respectively extracted (step 116), so as to obtain a plurality of block feature vectors of each critical frame, such as six block feature vectors. Then, the annotation word list is {1, 0, 1, 1, 0, 0} and the corresponding six block feature vectors are stored as a portion of a subsequent statistical model.

Meanwhile, low-level features of each critical frame are respectively extracted, so as to obtain a plurality of feature vectors of the shots (critical frames), wherein each feature vector is corresponding to an annotation word set such as {k1, k3, k4}. The aforementioned low-level features are the so-called visual features. There are many varieties of low-level features for an image, and each variety has different degrees of representation in accordance with the features of the image. For example, for determining if an unknown object is a zebra, the unknown object can be first checked to see if there are straight black-and-white (colored) stripes (textures) contained therein; for determining if an unknown object is a cow, the unknown object can be first checked to see if there is a horn (shape) contained therein. The low-level features used in the present embodiment can be a shape descriptor, a scalable color descriptor, a homogeneous texture descriptor or any combinations thereof. The low-level feature described by the scalable color descriptor shows the distribution of HSV color space, which mainly stores the vector values of the image in HSV color space after the Haar transform, and is greatly helpful in the search among images. The low-level feature described by the homogeneous texture descriptor shows the material texture features in an image, wherein the Gabor filter function is used to filter the image via the filer with texture tendency and scope, and the momentary energy appearing in the frequency domain is recorded as the feature value.

Figure 3:
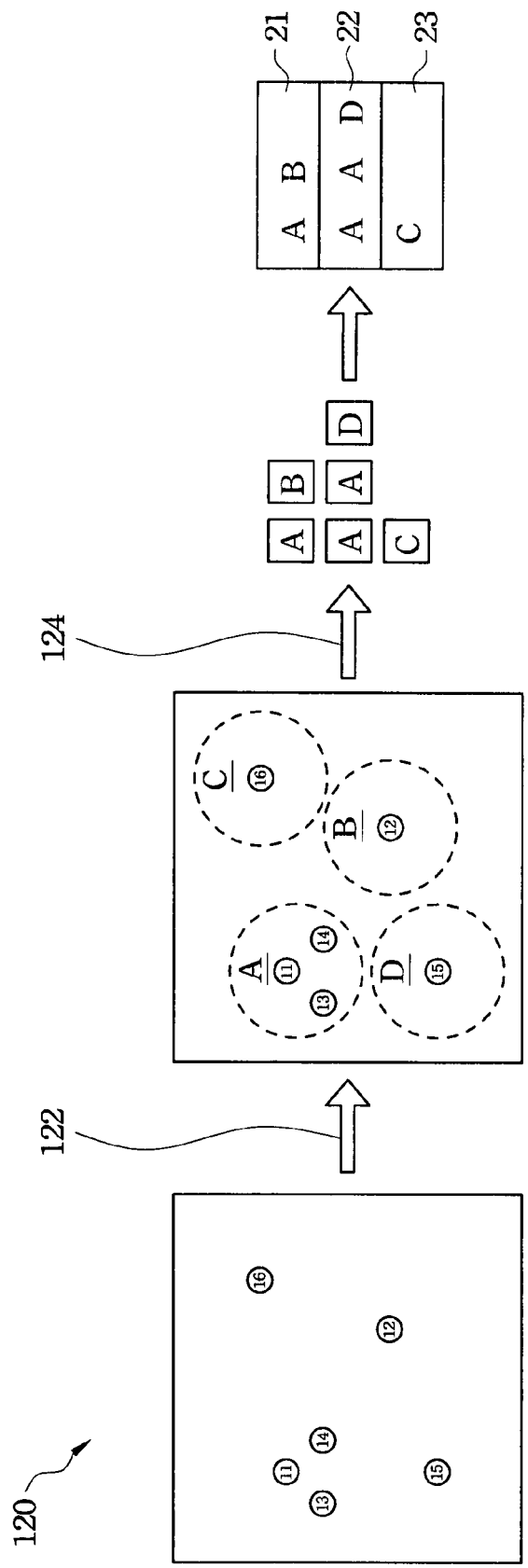
FIG. 3 is a schematic diagram showing an encoding step according to the embodiment of the present invention.

Referring FIG. 2 and FIG. 3, FIG. 3 is a schematic diagram showing an encoding step according to the embodiment of the present invention. After step 112, an encoding step 120 is performed. Such as shown in FIG. 3, a K-means algorithm is used to perform a grouping step 122 for dividing the feature vectors 11-16 of the shots into a plurality of shot groups (such as shown by dotted circles), wherein the shot groups have a plurality of identification codes A-D respectively, and the identification codes A-D are the unique codes of the respective shot groups. Thereafter, the feature vectors 11-16 are corresponded to the identification codes A-D respectively. Then, a segmentation step 124 is performed to combine the identification codes A-D of the shot groups as at least one scene 21-23, such as {A, B}, {A, A, D}, {C}. Thereafter, the scenes 21-23 are integrated as the transaction data tables used for data mining.

Please refer to FIG. 1 continuously. After the data-preprocessing step 110 is performed, in the training stage, step 130 is performed to build a statistical model by using the block feature vectors and the at least one annotation word with respect to each shot in accordance with a Gaussian Mixtures Model and conditional probabilities, wherein the statistical model has a statistical probability list used for indicating the respective appearing probabilities of the fundamental words corresponding to the block feature vectors of each shot.

Please refer to FIG. 1 and FIG. 3 continuously. In the training stage 100, step 140 is performed to build a sequential model. At first, a continuous relevance algorithm is used to find frequent patterns of the shot groups in the scenes 21-23, thereby obtaining a plurality of sequential rules, wherein the sequential rules are the sequential transaction combinations of any two identification codes arbitrarily selected in each of the scenes 21-23. Then, the sequential model is built in accordance with each of the sequential rules and the annotation words corresponding thereto, wherein the sequential model has a sequential probability list used for indicating the respective appearing probabilities of the fundamental words corresponding to each of the sequential rules. Hereinafter, an example is stated for explaining step 140.

Please refer to Tables 1 to Table 4. Assume that there are fifteen shots and four scenes 1-4 in the current training data, wherein those fifteen shots are divided into six groups (their respective identification codes are A-F). The result after grouping is such as shown in Table 2, wherein k1-k8 are annotation words.

TABLE 2

Transaction Data Tables for Sequential Model

|   | C  | B  | A  | E  | F  | B  |
|---|----|----|----|----|----|----|
| 1 | k1 | k3 |    | k1 | k5 | k3 |
|   |    |    | k5 |    |    |    |
|   | k2 | k4 |    | k7 | k6 | k6 |

|   | A  | B  | D  |
|---|----|----|----|
| 2 | k1 | k5 | k1 |
|   | k2 | k3 | k4 |

|   | B  | C  | D  |
|---|----|----|----|
| 3 | k3 | k2 | k4 |
|   | k5 | k4 | k5 |

|   | A  | E  | C  |
|---|----|----|----|
| 4 | k2 | k7 | k1 |
|   | k5 | k8 | k2 |

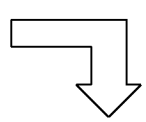

| 1 | C | B | A | E | F | B |
| 2 | A | B | D |
| 3 | B | C | D |
| 4 | A | E | C |

Such as shown in Table 2, the frequent patterns of the shot groups A-F in the scenes 1-4 are found. Assume that the minimum support is 0.08. Since repeated items may exist in each transaction according to the continuous relevance algorithm, the multiple combinations have to be taken into account for computing the number of frequent patterns. Such as shown in equations (1) and (2), L1 is the number of the entire frequent patterns of the transaction data tables; and L2 is the number of the sequential transaction combinations of any two items arbitrarily selected in each of the transactions.

$$L1 = C_1^6 + C_1^3 + C_1^3 + C_1^3 = 15 \quad (1)$$

$$L2 = C_2^6 + C_2^3 + C_2^3 + C_2^3 = 24 \quad (2)$$

Since the present embodiment does not consider L1, the sequential model of the present embodiment is mainly to derive the key word(s) for annotation to the final single shot, and has to take sequential orders into consideration. In the present embodiment, the frequent patterns of the first level are first found, and then the frequent patterns of the next level are generated via the frequent patterns of the previous level, and the minimum support of each candidate item (frequent pattern) is computed, and then the frequent patterns lacking of sufficient supports are removed, thereby obtaining the entire frequent patterns. The frequent patterns obtained have the sequential-order features, and the sequential model of the present embodiment is desired to derive the rule for the final item, and thus, for example, {C, B, A} would become {C, B}→{A}. Accordingly, the entire frequent patterns are converted to the format desired in the present embodiment, such as shown in the right side of Table 3.

TABLE 3

Frequent Patterns for Sequential Model

| L1 | | L2 | | | Rules |
|---|---|---|---|---|---|
| A | 3/15 | C | B | 2/24 | C→B |
| B | 4/15 | B | D | 2/24 | B→D |
| C | 3/15 | A | B | 2/24 | A→B |
| D | 2/15 | A | E | 2/24 | A→E |
| E | 2/15 | | | | |

Hereinafter, the method for generating a sequential probability list is explained. With respect to all the sequential rules, the numbers of the annotation words meeting the respective sequential rules are calculated, and then are added to the sequential probability list in accordance with each sequential rule. However, it is noted that the sequential orders have to be considered, i.e. only those appearing in sequence can be counted. For example, the rule {C}→{B} merely appears twice in the first transaction as shown in Table 2, i.e. positions 1, 2 and positions 1, 6 in the first transaction, and the appearing probabilities of the annotation words corresponding to the rule {C}→{B} are calculated in accordance with those two sets of position, i.e. k3 are shown twice; k4 once; and k6 once, and the probability list for the rule {C}→{B} is {0, 0, 2, 1, 0, 1, 0, 0}. In the similar way, a sequential probability list for all the sequential rules are obtained as shown in Table 4. The sequential probability list for the sequential rules is used in the subsequent predicting stage for deriving the probability values of the annotation words for the shot to be annotated.

TABLE 4

Sequential Probability List for Sequential Model

| | k1 | k2 | k3 | k4 | k5 | k6 | k7 | k8 |
|---|---|---|---|---|---|---|---|---|
| C→B | 0 | 0 | 2 | 1 | 0 | 1 | 0 | 0 |
| B→D | 1 | 0 | 0 | 2 | 1 | 0 | 0 | 0 |
| A→B | 0 | 0 | 2 | 0 | 1 | 1 | 0 | 0 |
| A→E | 1 | 0 | 0 | 0 | 0 | 0 | 2 | 1 |

Figure 4:
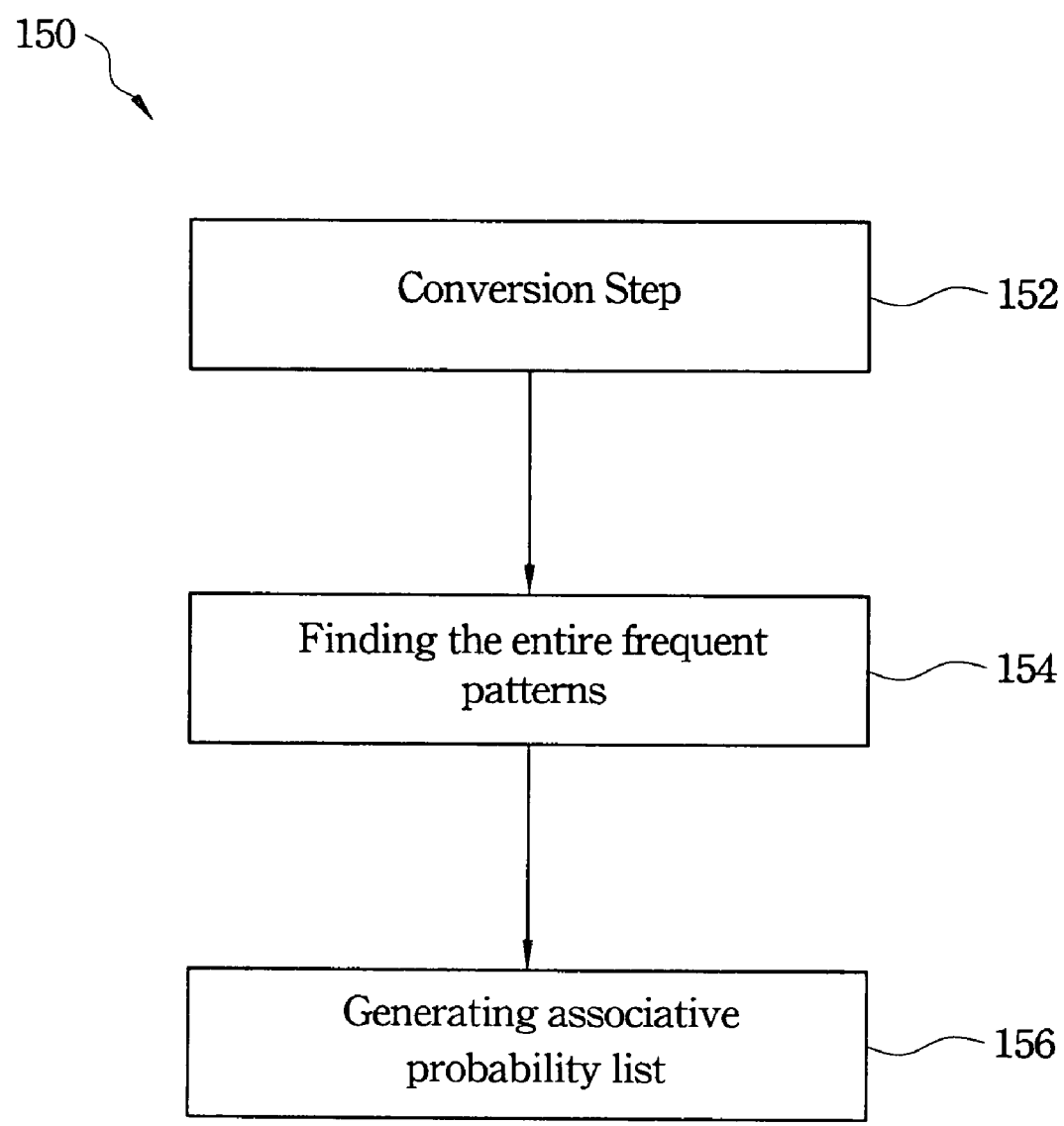
FIG. 4 is a schematic flow diagram showing the process for building an association model according to the embodiment of the present invention.

Referring to FIG. 1 and FIG. 4, FIG. 4 is a schematic flow diagram showing the process for building an association model according to the embodiment of the present invention. In the training stage 100, step 150 is performed for building an association model. At first, a conversion step 152 is performed for removing the identification codes repeated in each scene, and then sorting the identification codes in each scene. Then, step 154 is performed for finding the entire frequent patterns of the shot groups in the scenes in accordance with an association rules algorithm, a predetermined minimum support and a predetermined minimum reliance level, thereby obtaining a plurality of association rules, wherein the final item in each association rule only has one single identification code, i.e. only the association rules with single final items are required. Thereafter, step 156 is performed for generating an associative probability list, wherein the transaction data meeting the association rules are found, and the appearing probabilities of the annotation words corresponding to the final items of the associative rules are calculated in accordance with each associative rule, and at last, each associative rule has its own probability list so as to construct the association model, wherein the association model has an associative probability list used for indicating the respective appearing probabilities of the fundamental words corresponding to each associative rule. The difference between the sequential model and the association model is that: the association model does not need to consider the sequential relationship, i.e. as long as the items of the associative rules appear in the transaction data, the annotation words corresponding thereto have to be included in the associative probability list. Hereinafter, an example is stated for explaining the step 150.

Please refer to Table 5 to Table 8. Assume that there are fifteen shots and four scenes 1-4 in the current training data, wherein those fifteen shots are divided into six groups (their respective identification codes are A-F). The result after grouping is shown as the left side of Table 5. Thereafter, the items repeated are removed. For example, in the first transaction, there are two Bs shown, and thus only one B is left. Then, a sorting step is performed, such as shown in the right side of Table 5.

TABLE 5

Transaction Data Tables for Association Model

| | C | B | A | E | F | B |
|---|---|---|---|---|---|---|
| 1 | k1 | k3 | k5 | k1 | k5 | k3 |
| | k2 | k4 | | k7 | k6 | k6 |

| | A | B | D |
|---|---|---|---|
| 2 | k1 | k5 | k1 |
| | k2 | k3 | k4 |

| | B | C | D |
|---|---|---|---|
| 3 | k3 | k2 | k4 |
| | k5 | k4 | k5 |

| | A | E | C |
|---|---|---|---|
| 4 | k2 | k7 | k1 |
| | k5 | k8 | k2 |

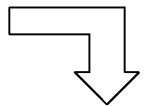

| 1 | A | B | C | E | F |
| 2 | A | B | D | | |
| 3 | B | C | D | | |
| 4 | A | C | E | | |

A step is first performed for finding the frequent patterns, wherein the entire frequent patterns are found by setting the minimum support to 1/2 and using the association rules algorithm, such as shown in Table 6.

TABLE 6

Frequent Patterns for Association Model

| L1 | | L2 | | L3 | | |
|---|---|---|---|---|---|---|
| A | 3/4 | A B | 1/2 | A C E | 1/2 | |
| B | 3/4 | A C | 1/2 | | | |
| C | 3/4 | A E | 1/2 | | | |
| D | 1/2 | B C | 1/2 | | | |
| E | 1/2 | B D | 1/2 | | | |
| | | C E | 1/2 | | | |

Then, only the associative rules of which the final item is a single identification code are derived, and the minimum reliance level is set to 2/3, such as shown in Table 7.

TABLE 7

Associative Rules for Association Model

| A→B | 2/3 | B→C | 2/3 | A C→E | 1 |
| B→A | 2/3 | C→B | 2/3 | A E→C | 2/3 |
| A→C | 2/3 | B→D | 1 | C E→A | 2/3 |
| C→A | 2/3 | D→B | 2/3 | | |
| A→E | 1 | C→E | 2/3 | | |
| E→A | 2/3 | E→C | 2/3 | | |

Hereinafter, the method for generating an associative probability list is explained. Since the associative rules are not limited to the sequential relationship, it is only needed to consider whether the respective associative rules appear in the same transaction. For example, the rule {A}→{B} appears three times in the entire database as shown in Table 5, which are shown at positions 2, 3 and positions 1, 6 in the first transaction; and positions 1, 2 in the second transaction. The appearing probabilities of the annotation words corresponding to the rule {A}→{B} are calculated in accordance with these three sets of position, i.e. k3 are shown three times; k4, k5 and k6 once, and the probability list for the rule {A}→{B} is {0, 0, 3, 1, 1, 1, 0, 0}. In the similar way, an associative probability list for all the associative rules are obtained as shown in Table 8. The associative probability list for the associative rules is used in the subsequent predicting stage for deriving the probability values of the annotation words for the shot to be annotated.

TABLE 8

Associative Probability List for Association Model

| | k1 | k2 | k3 | k4 | k5 | k6 | k7 | k8 |
|---|---|---|---|---|---|---|---|---|
| A→B | 0 | 0 | 3 | 1 | 1 | 1 | 0 | 0 |
| A→C | 2 | 2 | 0 | 0 | 0 | 0 | 0 | 0 |
| A→E | 1 | 0 | 0 | 0 | 0 | 0 | 2 | 1 |
| B→A | 1 | 1 | 0 | 0 | 1 | 0 | 0 | 0 |
| B→C | 1 | 2 | 0 | 1 | 0 | 0 | 0 | 0 |
| B→D | 1 | 0 | 0 | 2 | 1 | 0 | 0 | 0 |
| C→A | 0 | 1 | 0 | 0 | 2 | 0 | 0 | 0 |
| C→B | 0 | 0 | 3 | 1 | 1 | 1 | 0 | 0 |
| C→E | 1 | 0 | 0 | 0 | 0 | 0 | 2 | 1 |
| D→B | 0 | 0 | 2 | 0 | 2 | 0 | 0 | 0 |
| E→A | 0 | 1 | 0 | 0 | 2 | 0 | 0 | 0 |
| E→C | 2 | 2 | 0 | 0 | 0 | 0 | 0 | 0 |
| AC→E | 1 | 0 | 0 | 0 | 0 | 0 | 2 | 1 |
| AE→C | 2 | 2 | 0 | 0 | 0 | 0 | 0 | 0 |
| CE→A | 0 | 1 | 0 | 0 | 2 | 0 | 0 | 0 |

Predicting Stage 200

Figure 5:
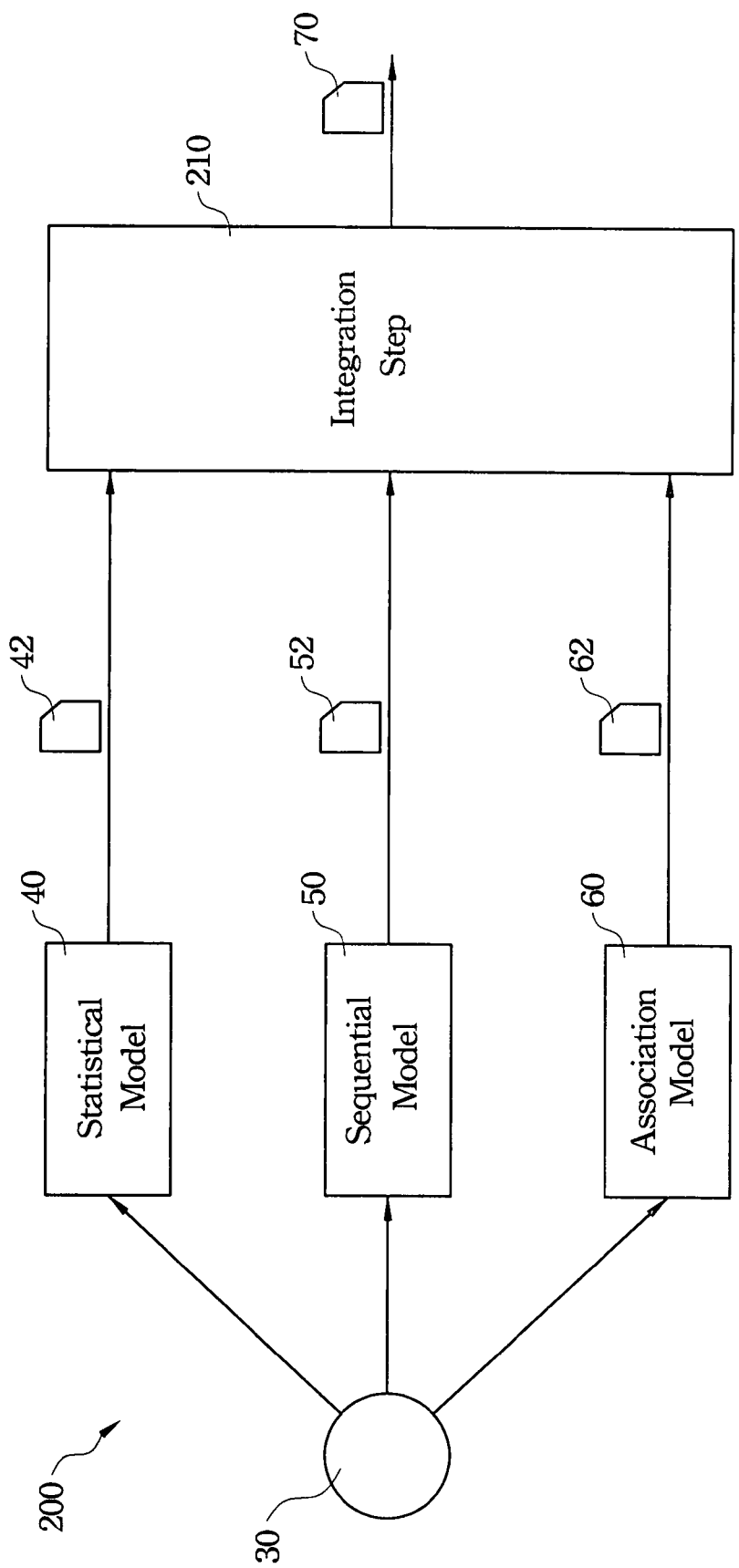
FIG. 5 is a schematic diagram showing a predicting stage according to the embodiment of the present invention.

Referring to FIG. 1 and FIG. 5, FIG. 5 is a schematic diagram showing a predicting stage according to the embodiment of the present invention. After the training stage 100, the predicting stage is entered. In the predicting stage 200, the statistical model 40, the sequential model 50 and the associative model 60 built in the training stage 100 are used for predicting annotation words suitable for annotation to a shot 30 to be annotated, wherein the shot 30 is composed of a plurality of frames and belongs to a scene. The statistical model 40 is used for treating the low-level features of the shot 30 so as to obtain a keyword statistical probability list 42; the sequential model 50 and the associative model 60 are used for treating the relationships between the shot 30 and the shot antecedent to the shot 30 in the scene so as to obtain a keyword sequential probability list 52 and a keyword associative probability list 62. The keyword statistical probability list 42 is used for indicating the respective appearing probabilities of the fundamental words corresponding to the block feature vectors of the shot 30, and the keyword sequential probability list 52 is used for indicating the respective appearing probabilities of the fundamental words corresponding to the sequential rules of the shot 30, and the keyword associative probability list 62 are used for indicating the respective appearing probabilities of the fundamental words corresponding to the associative rules of the shot 30.

The beginning preprocessing step in the predicting stage 200 is similar to the data-preprocessing step 110 in the training stage 100. At first, a critical frame is selected from the frames forming the shot 30. Then, the critical frame of the shot 30 is divided into N×M units of image blocks, wherein N and M are the integers greater than 0, such as 3×2 units of image blocks. Thereafter, the low-level features of these small image blocks are extracted, and then are fed into the statistical model 40 for applying the probability formula to the candidate annotation words. For the small rectangular low-level features, the final result as equation (3) can be obtained via a series of operations and development.

$$P(w|r) = P(w, r)/P(r) \quad (3)$$
$$= (\Sigma P(J)P(w, r|J))/P(r)$$
$$= (\Sigma P(J)(\Pi P(w|J)\Pi P(r|J)))/P(r)$$

wherein r stands for the small rectangle after division; J stands for the critical frame in the training data; and w stands for the candidate annotation word.

Thereafter, the probability list of all the annotation words corresponding to the low-level features of the rectangular image blocks (small rectangles) are obtained. After all of the probabilities of the respective small rectangles are added up and normalized, the keyword statistical probability list 42 of the statistical model 40 can be obtained for pointing out the respective appearing probabilities of the fundamental words corresponding to the block feature vectors of the shot 30.

Further, in the training stage 200, at least one continuous shot antecedent to the shot 30 in the same scene is inputted into the sequential model 50 and the association model 60, and at least one critical frame of the continuous shot is selected from the frame forming the continuous shot. Then, low-level features of the critical frames of the shot 30 and the continuous shot are respectively extracted, so as to obtain a plurality of feature vectors. Thereafter, the shot groups obtained in the training stage 100 are used herein for computing a central point of each shot, and then the critical frame of each shot is assigned to the shot group closest thereto, wherein the identification codes of the shot groups are used to replace the low-level features, i.e. each critical frame having a unique identification code.

The sequential model 50 basically adopts the shot 30 desired to be predicted (annotated) as a target, wherein the continuous shots antecedent to the target (shot 30) in the same scene are taken into account, and those continuous shots are used for finding the sequential rules in the sequential model 50 in accordance with the continuous relevance algorithm used in the training stage 100, wherein the sequential rules are the sequential transaction combinations of any two identification codes arbitrarily selected in the same scene. When the items before the shot 30 meet the sequential rules, the probability lists of the annotation words corresponding thereto can be retrieved and added up, and then the results are divided by the total number of the items used for probability calculation and become a probability mode. The meaning of the sequential model 50 is to derive the shots which will appear later in accordance with the shots shown up in the same scene.

Referring to Table 9, for example, the sequential rules (Table 4) shown in the aforementioned example are used as a sample. Assume that there is a new scene, wherein there are four shots desired to be predicted (annotated). After grouping, these four shots are converted into {D, A, B, C}, wherein {D} is at position p1; {A} is at position p2; {B} is at position p2; and {C} is at position p3. Since no items exits before position p1, no rules are qualified. At position p2, the shot {D} exists before it, and it is found that the shot {D} does not meet any sequential rules in Table 4. Similarly, the shots (D, A) exist before position p3, and meet the sequential rules {A}→{B} and {A}→{E}. The probability lists {0, 0, 2, 1, 0, 1, 0, 0} and {1, 0, 0, 2, 1, 0, 0, 0} of these qualified rules {A}→{B} and {A}→{E} are added up to get {1, 0, 2, 3, 1, 1, 0, 0}, and then {1, 0, 2, 3, 1, 1, 0, 0} is converted to the probability mode {1/8, 0, 2/8, 3/8, 1/8, 1/8, 0, 0}. At position p4, the shots (D, A, B) exist before it, and meet three sequential rules, and the probability lists of those three sequential rules are added up and converted to get the results {(0+1+1)/12, 0, (0+0+2)/12, (1+2+2)/12, (0+1+1)/12, (1+0+0)/12, 0, 0}}. Accordingly, {1/8, 0, 2/8, 3/8, 1/8, 1/8, 0, 0} and {(0+1+1)/12,0, (0+0+2)/12, (1+2+2)/12, (0+1+1)/12, (1+0+0)/12, 0, 0} form the keyword sequential probability list 52.

TABLE 9

Comparison Results of Applying Sequential Model

| Position | Left-side Items | Rules Qualified | Probability List |
|---|---|---|---|
| p1 | none | none | {0, 0, 0, 0, 0, 0, 0, 0} |
| p2 | D | none | {0, 0, 0, 0, 0, 0, 0, 0} |
| p3 | D, A | A→B | {1/8, 0, 2/8, 3/8, 1/8, 1/8, 0, 0} |
|  |  | A→E |  |
| p4 | D, A, B | A→B | {2/12, 0, 2/12, 5/12, 2/12, 1/12, 0, 0} |
|  |  | A→E |  |
|  |  | B→D |  |

Further, the comparing method in the association model is similar to that in the sequential model, but has different meanings, wherein the sequential model is used to consider the rules having the sequential-order features for deriving what the next shot is; and the association model is used to consider what shots would appear together in the same scene without the sequential-order limit, i.e. the application of associative rules. In the step for predicting the association model 60, at first, the identification codes repeated in the same scene are removed, and the remaining identification codes are sorted. Thereafter, the entire frequent patterns of shot groups in the same scene are found in accordance with the association rules algorithm used in the training stage 100, thereby obtaining a plurality of association rules, wherein the final item in each association rule only has one single identification code. Then, the association rules are inputted into the association model 60, so as to obtain the keyword associative probability list 62 used for indicating the respective appearing probabilities of the fundamental words corresponding to the associative rules regarding the feature vector (identification code) of the shot 30.

Referring to Table 10, for example, the associative rules (Table 8) shown in the aforementioned example are used as a sample. Just as described in the aforementioned example for the sequential model, the shots are converted into {D, A, B, C} after grouping. Since no items exits before position p1, no rules are qualified. At position p2, the shot {D} exists before it, and it is found that the shot {D} meets the associative rule {D}→{B}, and the associative rule is added to the probability list and converted. Similarly, the shots (D, A) exist before position p3, and meet four sequential rules {D}→{B}, {A}→{B}, {A}→{C} and {A}→{E}, and the associative rules are also added to the probability list and converted. At position p4, the shots (D, A, B) exist before it, and meet seven associative rules {D}→{B}, {A}→{B}, {A}→{C}, {A}→{E}, {B}→{A}, {B}→{C}and {B}→{D}, and the associative rules are also added to the probability list and converted. Accordingly, the keyword associative probability list 62 is obtained as shown in Table 10.

TABLE 10

Comparison Results of Applying Association Mode

| Position | Left-side Items | Rules Qualified | Probability List |
|---|---|---|---|
| p1 | none | none | {0, 0, 0, 0, 0, 0, 0, 0} |
| p2 | D | D→B | {0, 0, 2/4, 0, 2/4, 0, 0, 0} |
| p3 | D, A | D→B<br>A→B<br>A→C<br>A→E | {3/18, 2/18, 5/18, 1/18, 3/18, 1/18, 2/18, 1/18} |
| p4 | D, A, B | D→B,<br>B→A<br>A→B,<br>B→C<br>A→C,<br>B→D<br>A→E | {6/29, 5/29, 5/29, 4/29, 5/29, 1/29, 2/29, 1/29} |

Thereafter, in the predicting stage 200, an integration step 210 is performed for adding up the respective appearing probabilities of the fundamental words in the keyword statistical probability list 42 and the keyword sequential probability list 52 and/or the keyword associative probability list 62, so as to obtain a keyword appearing probability list 70. Then, at least one second annotation word is selected from the keyword appearing probability list 70 in accordance with a predetermined lower limit, wherein the second annotation word is used as an annotation to the shot 30.

It can be known from the above description that the output result from each model is a keyword probability list, and at the final stage of the present embodiment, the integration method is used to combine the keyword probability lists for predicting the annotation to the shot 30. The present embodiment chooses the statistical model as the major prediction tool, but not the sequential model or the association model, since there may be no rules qualified in those two models and no annotation words can be found thereby. Therefore, if the sequential model or the association model is chosen as the major prediction tool, then the situation with no annotation words found may occur. Accordingly, the present embodiment chooses the statistical model as the major prediction tool, for the statistical model is to compare the low-level features, wherein it only matters the probability values and does not have the problem of not finding any annotation words, i.e. the statistical model is used as the basis in each combination. Then, in the combined probability list (keyword appearing probability list), the words of which the probabilities are higher than the predetermined lower limit are selected as the keywords for annotation to the shot. In sum, there are three combinations in total for the present embodiment.

Referring to Table 11, for example, assume that all of the fundamental words are {car, road, sky, person, building, outdoors}, and the probability list predicted by the statistical model is {0.13, 0.1, 0.5, 0.1, 0.12, 0.05}. If the first three items with higher probabilities are selected, then the prediction result from only the statistical model is {sky, car, building}. Assume that the probability lists predicted by the sequential model and the association model are {0, 0.5, 0.25, 0, 0.125, 0.125} and {0.5, 0.1, 0, 0.3, 0.1, 0}. If the probability lists of the statistical model and the sequential model are combined, the result is {0.13, 0.6, 0.75, 0.1, 0.245, 0.175}, wherein the first three items with higher probabilities are {sky, road, building}, and the result is different since the probability of {road} is raised by the sequential model so as to exclude {car}. If the probability lists of the statistical model and the association model are combined, the result is {0.63, 0.2, 0.5, 0.4, 0.22, 0.05}, wherein the first three items with higher probabilities are {car, sky, person}, and the result is different since the probability of {person} is raised by the association model so as to exclude {building}. If these three models are combined, the result is {0.63, 0.7, 0.75, 0.4, 0.345, 0.175}, wherein the first three items with higher probabilities are {{sky, road, car}}. Accordingly, the probability of the fundamental words are different in accordance with different combinations, and thus different results of annotation words are obtained.

TABLE 11

Results of Probability Lists combined

| | car | road | sky | person | building | outdoors | Result |
|---|---|---|---|---|---|---|---|
| Statistical Model | 0.13 | 0.1 | 0.5 | 0.1 | 0.12 | 0.05 | sky car building |
| Sequential Model | 0 | 0.5 | 0.25 | 0 | 0.125 | 0.125 | |
| Association Model | 0.5 | 0.1 | 0 | 0.3 | 0.1 | 0 | |
| Statistical Model + Sequential Model | 0.13 | 0.6 | 0.75 | 0.1 | 0.245 | 0.175 | sky road building |
| Statistical Model + Association Model | 0.63 | 0.2 | 0.5 | 0.4 | 0.22 | 0.05 | car sky person |
| Statistical Mode + Sequential Model + Association Model | 0.63 | 0.7 | 0.75 | 0.4 | 0.345 | 0.175 | car road sky |

It can be known from the embodiment of the present invention that, the present invention can combine the statistical model and the rule models (the sequential model and the association model) for effectively promoting the predicting accuracy in an automatic annotation process without the assistance from experts; is suitable for use in various video clips by using the fundamental low-level features as the elements for data mining; and uses the statistical model as the basic predicting tool and the rule models as the auxiliary tool, thus assuring that the annotation words can be found.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A video annotation method by integrating visual features and frequent patterns, comprising:
   providing a plurality of fundamental words;
   providing an annotated video clip, wherein said annotated video clip is composed of a plurality of first shots, and each of said first shots is composed of a plurality of first frames, and each of said first shots is corresponding to at least one first annotation word of said fundamental words;
   performing a data preprocessing step, said data preprocessing step comprising:
      selecting a plurality of first critical frames respectively with respect to said first shots from said first frames of each of said first shots;
      dividing each of said first critical frames into a plurality of first image blocks;
      respectively extracting low-level features of said first image blocks of each of said first shots, thereby obtaining a plurality of first block feature vectors of each of said first critical frames;
      respectively extracting low-level features of each of said first critical frames, thereby obtaining a plurality of first feature vectors of said first shots;
   performing a grouping step for dividing said first feature vectors of said first shots into a plurality of shot groups, wherein said shot groups have a plurality of identification codes respectively;
   corresponding said first feature vectors of said first shots to said identification codes respectively; and
   combining said identification codes of said shot groups as at least one first scene;
   building a statistical model by using said first block feature vectors and said at least one first annotation word with respect to each of said first shots in accordance with a Gaussian Mixtures Model and conditional probabilities, wherein said statistical model has a statistical probability list used for indicating the respective appearing probabilities of said fundamental words corresponding to said first block feature vectors of each of said first shots;
   building a sequential model, comprising:
      finding frequent patterns of said shot groups in said first scene in accordance with a continuous relevance algorithm, thereby obtaining a plurality of first sequential rules, wherein said first sequential rules are the sequential transaction combinations of any two identification codes arbitrarily selected in each of said at least one first scene; and
      building said sequential model in accordance with each of said first sequential rules and said at least one first annotation word corresponding thereto, wherein said sequential model has a sequential probability list used for indicating the respective appearing probabilities of said fundamental words corresponding to each of said first sequential rules;
   performing a predicting stage for inputting a second shot desired to be annotated into said statistical model and said sequential model, thereby obtaining a keyword statistical probability list and a keyword sequential probability list, wherein said keyword statistical probability list is used for indicating the respective appearing probabilities of said fundamental words corresponding to a plurality of second block feature vectors of said second shot, and said keyword sequential probability list is used for indicating the respective appearing probabilities of said fundamental words corresponding to a plurality of second sequential rules of said second shot, and said second shot belongs to a second scene and is composed of a plurality of second frames.

2. The video annotation method of claim 1, wherein the low-level features of said first image blocks of each of said first shots and the low-level features of each of said first critical frames are selected from the group consisting of a shape descriptor, a scalable color descriptor, a homogeneous texture descriptor and any combinations thereof.

3. The video annotation method of claim 1, further comprising:
   building an association model, comprising:
      removing said identification codes repeated in each of said at least one first scene;
      sorting said identification codes in each of said at least one first scene;
      finding the entire frequent patterns of said shot groups in said at least one first scene in accordance with an association rules algorithm, thereby obtaining a plurality of first association rules, wherein the final item in each of said first association rules only has one single identification code; and
   building said association model in accordance with each of said first association rules and said at least one first annotation word corresponding thereto, wherein said association model has an associative probability list used for indicating the respective appearing probabilities of said fundamental words corresponding to each of said first associative rules; and
   performing said predicating stage for inputting said second shot desired to be annotated into said association model, thereby obtaining a keyword associative probability list used for indicating the respective appearing probabilities of said fundamental words corresponding to associative rules of said second shot.

4. The video annotation method of claim 3, wherein said performing said predicting stage further comprises:
   selecting a second critical frame from said second frames of said second shot;
   respectively extracting low-level features of said second critical frame, thereby obtaining a plurality of second feature vectors;
   performing said grouping step on said second feature vectors in accordance with a statistic distance algorithm, and corresponding said second feature vectors to said identification codes respectively;
   removing said identification codes repeated in said second scene;
   sorting said identification codes in said second scene;
   finding the entire frequent patterns of shot groups in said second scene in accordance with said association rules algorithm, thereby obtaining a plurality of second association rules, wherein the final item in each of said second association rules only has one single identification code; and
   inputting said second association rules into said association model, thereby obtaining said keyword associative probability list used for indicating the respective appearing probabilities of said fundamental words corresponding to said second associative rules regarding said second shot.

5. The video annotation method of claim 4, wherein said statistic distance algorithm is a Euclidean Distance method.

6. The video annotation method of claim 1, wherein said performing said predicting stage further comprises:

selecting a second critical frame from said second frames of said second shot;

dividing said second critical frame into a plurality of second image blocks;

respectively extracting low-level features of said second image blocks, thereby obtaining said second block feature vectors of said second critical frame of said second shot and; and inputting said second block feature vectors into said statistical model, thereby obtaining said keyword statistical probability list used for indicating the respective appearing probabilities of said fundamental words corresponding to said second block feature vectors.

7. The video annotation method of claim 6, wherein said second critical frame is divided into N×M units of second image blocks, wherein N and M are the integers greater than 0.

8. The video annotation method of claim 6, wherein the low-level features of said second image blocks and the low-level features of said second critical frame are selected from the group consisting of a shape descriptor, a scalable color descriptor, a homogeneous texture descriptor and any combinations thereof.

9. The video annotation method of claim 6, wherein said performing said predicting stage further comprises:

inputting at least one third shot antecedent to said second shot in said second scene, and respectively selecting at least one third critical frame of said at least one third shot;

respectively extracting low-level features of said second critical frame and low-level features of said at least one third critical frame, thereby obtaining a plurality of second feature vectors;

performing said grouping step on said second feature vectors in accordance with a statistic distance algorithm, and corresponding said second feature vectors to said identification codes respectively;

finding frequent patterns of said shot groups in said second scene in accordance with the continuous relevance algorithm, thereby obtaining a plurality of second sequential rules, wherein said second sequential rules are the sequential transaction combinations of any two identification codes arbitrarily selected in said second scene; and inputting said second sequential rules into said sequential model, thereby obtaining said keyword sequential probability list used for indicating the respective appearing probabilities of said fundamental words corresponding to said second sequential rules with respect to said second feature vectors.

10. The video annotation method of claim 9, wherein said statistic distance algorithm is an Euclidean Distance method.

11. The video annotation method of claim 9, wherein the low-level features of said second critical frame and the low-level features of said at least one third critical frame are selected from the group consisting of a shape descriptor, a scalable color descriptor, a homogeneous texture descriptor and any combinations thereof.

12. The video annotation method of claim 1, wherein said performing said predicting stage further comprises:

adding up the respective appearing probabilities of said fundamental words in said keyword statistical probability list and said keyword sequential probability list, thereby obtaining a keyword appearing probability list; and selecting at least one second annotation word from said keyword appearing probability list in accordance with a predetermined lower limit, wherein said at least one second annotation word is used as an annotation to said second shot.

13. The video annotation method of claim 1, wherein said performing said predicting stage further comprises:

adding up the respective appearing probabilities of said fundamental words in said keyword statistical probability list and said keyword associative probability list, thereby obtaining a keyword appearing probability list; and selecting at least one second annotation word from said keyword appearing probability list in accordance with a predetermined lower limit, wherein said at least one second annotation word is used as an annotation to said second shot.

14. The video annotation method of claim 1, wherein said performing said predicting stage further comprises:

adding up the respective appearing probabilities of said fundamental words in said keyword statistical probability list, said keyword sequential probability list and said keyword associative probability list, thereby obtaining a keyword appearing probability list; and selecting at least one second annotation word from said keyword appearing probability list in accordance with a predetermined lower limit, wherein said at least one second annotation word is used as an annotation to said second shot.

15. The video annotation method of claim 6, wherein each of said first critical frames is divided into N×M units of second image blocks, wherein N and M are the integers greater than 0.

16. The video annotation method of claim 1, wherein said first block feature vectors are corresponding to said at least one first annotation word, and each of said first feature vectors is corresponding to said at least one first annotation word.

17. The video annotation method of claim 1, wherein said fundamental words are selected from the standard category tree provided by NIST (National Institute of Standards and Technology).

* * * * *